US010216857B2

(12) United States Patent
Perret

(10) Patent No.: US 10,216,857 B2
(45) Date of Patent: Feb. 26, 2019

(54) COMMUNICATING DIGITAL DISPLAY DEVICE

(71) Applicant: RevPOR Group FZ-LLC, Dubai (AE)

(72) Inventor: Stéphane Perret, Vence (FR)

(73) Assignee: RevPOR Group FZ-LLC, Dubai (AE)

( * ) Notice: Subject to any disclaimer, the term of this patent is extended or adjusted under 35 U.S.C. 154(b) by 466 days.

(21) Appl. No.: 14/677,358

(22) Filed: Apr. 2, 2015

(65) Prior Publication Data

US 2015/0324332 A1  Nov. 12, 2015
US 2016/0335228 A9  Nov. 17, 2016

Related U.S. Application Data

(63) Continuation of application No. PCT/EP2013/002956, filed on Oct. 2, 2013.
(Continued)

(30) Foreign Application Priority Data

Oct. 2, 2012 (FR) ...................... 12 02612
Oct. 2, 2012 (FR) ...................... 12 02614
(Continued)

(51) Int. Cl.
G06F 17/30 (2006.01)
G06F 17/22 (2006.01)
(Continued)

(52) U.S. Cl.
CPC ........ G06F 17/30902 (2013.01); G06F 17/22 (2013.01); G06F 17/30244 (2013.01);
(Continued)

(58) Field of Classification Search
CPC ............... G06F 17/22; G06F 17/30244; G06F 17/30902
See application file for complete search history.

(56) References Cited

U.S. PATENT DOCUMENTS 6,009,465 A     12/1999  Decker et al.
2006/0041914 A1  2/2006  Seiden et al.
(Continued)

FOREIGN PATENT DOCUMENTS

WO    WO 0142953        6/2001
WO    WO 2005 096750   10/2005
(Continued)

OTHER PUBLICATIONS

Ethan Heilman, http—What is the difference between HTTP_CLIENT_IP and HTTP_X_FORWARDED_FOR, Sep. 16, 2011, found at stackoverflow forum, https://stackoverflow.com/questions/7445592/what-is-the-difference-between-http-client-ip-and-http-x-forwarded-for, Stack Exchange Inc., p. 1.*
(Continued)

*Primary Examiner* — Scott T Baderman
*Assistant Examiner* — Seung Woon Jung
(74) *Attorney, Agent, or Firm* — Saile Ackerman LLC; Stephen B. Ackerman

(57) ABSTRACT

A process for controlling the displaying of media on a display device, such as a digital frame, under the control of a centralized server accessing a contextual database. The process is based on the periodical transmission by said frame of a request comprising an identifier of said display device and also comprising headers defining contextual information reported to said server) and stored within said contextual database, said server responding to said request by means of a response defining the media to display, accompanied by headers defining one or more actions to be executed by said display device.

18 Claims, 6 Drawing Sheets

Related U.S. Application Data

(60) Provisional application No. 61/740,760, filed on Dec. 21, 2012.

(30) Foreign Application Priority Data

| | | | |
|---|---|---|---|
| Mar. 25, 2013 | (FR) | ...................................... | 13 00739 |
| Jul. 15, 2013 | (FR) | ...................................... | 13 01669 |
| Jul. 15, 2013 | (FR) | ...................................... | 13 01672 |
| Jul. 15, 2013 | (FR) | ...................................... | 13 01674 |
| Jul. 15, 2013 | (FR) | ...................................... | 13 01675 |

(51) Int. Cl.

| | |
|---|---|
| *H04L 29/08* | (2006.01) |
| *H04W 4/04* | (2009.01) |
| *G06Q 10/10* | (2012.01) |
| *H04W 4/70* | (2018.01) |
| *G06Q 50/12* | (2012.01) |
| *G06Q 30/00* | (2012.01) |
| *G08B 17/00* | (2006.01) |
| *G08B 19/00* | (2006.01) |

(52) U.S. Cl.
 CPC ............ *G06Q 10/10* (2013.01); *G06Q 30/00* (2013.01); *G06Q 50/12* (2013.01); *H04L 67/1095* (2013.01); *H04W 4/043* (2013.01); *H04W 4/70* (2018.02); *G08B 17/00* (2013.01); *G08B 19/005* (2013.01)

(56) References Cited

U.S. PATENT DOCUMENTS

| | | | |
|---|---|---|---|
| 2008/0120701 A1 | 5/2008 | Schiller et al. | |
| 2009/0276485 A1 | 11/2009 | Casassovici | |
| 2010/0075697 A1 | 3/2010 | Gupta et al. | |
| 2011/0060994 A1* | 3/2011 | Maxwell | ................. G06F 3/147 715/730 |
| 2011/0072040 A1 | 3/2011 | Handa et al. | |
| 2012/0081547 A1* | 4/2012 | Sitzmann | ............... H04N 7/185 348/143 |
| 2012/0122487 A1 | 5/2012 | Holm et al. | |
| 2012/0130845 A1 | 5/2012 | Telek et al. | |
| 2012/0173318 A1 | 7/2012 | Lee et al. | |
| 2012/0203605 A1 | 8/2012 | Morgan et al. | |
| 2012/0240060 A1* | 9/2012 | Pennington | ........... G06F 1/1618 715/753 |

FOREIGN PATENT DOCUMENTS

| | | |
|---|---|---|
| WO | WO 2009 081307 | 7/2009 |
| WO | WO 2012 012599 | 1/2012 |

OTHER PUBLICATIONS

French Search Report, dated Apr. 19, 2013, FA 773873 FR 1202612.
French Search Report, dated Mar. 18, 2015, FA 787096 FR 1301674.
French Search Report, dated Sep. 17, 2013, FA 776193 FR 1202614.
French Search Report, dated Sep. 18, 2013, FA 782033 FR 1300739.
French Search Report, dated Mar. 17, 2014, FA 787094 FR 1301669.
French Search Report, dated Mar. 17, 2014, FA 787095 FR 1301672.
French Search Report, dated Mar. 18, 2014, FA 787097 FR 1301675.
Written Opinion, dated Apr. 16, 2015, PCT/EP2013/002956.

\* cited by examiner

COMMUNICATING DIGITAL DISPLAY DEVICE

TECHNICAL FIELD

The present invention relates to the field of information display networking devices and particularly a communicating digital display device, such as a communicating digital device such as a digital photo frame, allowing a centralized management of the displayed information.

BACKGROUND

Numerous network displaying systems exists in the world in many public or private premises for the purpose of displaying a intermittent information or a continuous information.

One particularly knows the displaying systems used in the hotels and which are based on the television present in the different rooms, and which is widely used for the purpose of displaying a multimedia message for the hotel guest, at least when the television is not used for viewing a specific TV program. Such display is well known and only allows a very "general" information since every guest is assumed to receive a same information.

One also knows the displays systems which use digital tablets providing information on products and associated tools for ordering marketed products, either by means of specific tools or web services. But such systems are known to be sophisticated and costly.

Systems based on internet protocol (IP) phones with a display are also used in some hotels. Among the more sophisticated ones, some displays are fitted with a HTML type tactile interface which allows the user to browse within some dedicated services (such as known in the digital tablets). They also provide the opportunity to transmit information via the known SIP protocol. Such protocol allows the opening of a session with a phone by using its name (which can be the name of the room within the hotel) for the purpose of conveying multimedia information by means of the HTTP protocol (Hyper Text Transfer Protocol). The phone, being identified by the SIP name, comprises an internal HTTP server which can receive messages. A local component within the Hotel network infrastructure is required for performing the mapping between the room number and the IP address so as to allow the messages to be forwarded to the dedicated room.

Digital photo frames are devices which are widely spread out, particularly in public premises and also in hotels. They achieve a quite interesting solution, cheap and elegant. They may use today two different techniques for remotely displaying information: MRSS flows (Media Real Simple Syndication) as well as the so-called DLNA standard (Digital Living Network Alliance).

The DNLA standard allows the establishment of a connection between many different multimedia devices existing in a local network. This technique is based on UPnP (Universal Plug & Play), which however does not allow the connection of a high number of devices and, moreover requires the arrangement of a specific multimedia server on a same local network (PC, NAS, DVD). Such technique is thus not suitable for a centralized management of a high number of displays.

The MRSS standard allows the registration to a server providing multimedia content which can be accessed through the Web (URL) and a periodic loading of such data so as to display the content. The adjustment of the different parameters can be achieved on the photo frame and the dynamic of the slideshow can not be completely controlled by the content provider.

SUMMARY

None of those two existing techniques MRSS and DNLA allows the remote control of the frames from the content server existing on the Internet network.

Such is the problem which is solved by the different embodiments disclosed hereinafter.

It is an object of the present invention to provide a process for performing a large scale deployment of communicating digital frames for the purpose of allowing a dynamic, intermittent or continuous, displaying under the control of a centralized server controlling the dissemination of multimedia content.

It is a further object of the present invention to provide a management process for a wide number of digital frames and displays which are distributed in numerous different locations and territories, and thus facilitating the contextual management of the dissemination of the media and information under control of a centralized server.

It is a third object of the present invention to carry out a new type of digital frame which can be easily located within different physical locations of a predetermined site, and which can report to a centralized server information allowing centralized management and control of the dissemination of information and media content.

It is a fourth object of the present invention to achieve a digital frame which is inexpensive to manufacture and easy to be set up on a given site, particularly in the case of an hotel, and which offers new services for hotel guests.

These and other objects of the invention are achieved by means of a process for controlling the dissemination of media by means of a digital frame or display under the control of a centralized server accessing a contextual database. To achieve this, the digital frame periodically transmits a request to the server, which request comprises an identifier and headers defining contextual information to be reported to the server for the purpose of being stored, and particularly in the database.

Upon receipt of the request transmitted by the digital frame, the server responds by means of a response which comprises the identifier of the media content to display, also accompanied by headers used for defining one or more actions to be executed by the frame.

Preferably, the digital frame transmits a HTTP GET or POST request defining its identifier and accompanied by headers defining contextual information which is reported to the server, the latter responding with a response comprising an Extensible Mark-up Language, XML file including a list of URL defining the images to display as well as the display duration, also combined with headers defining one or more actions to be executed by the frame.

Preferably, the digital frame performs a comparison of the XML file with the file being currently displays so as to detect a response which could be transmitted by a cache and not directly from the server. In such situation, the detection results in the continuation of the displaying of the media being currently displayed.

In one particular embodiment, the headers which accompany the requests issued by the frame are used for defining information being captured by one or more sensors, among the others:

Preferably, the response which is transmitted by the motion sensor, particularly based on a infrared sensor;

a brightness sensor;
means for location;
one or more safety sensors, such as a smoke detector;
a compass type sensor.

In one particular embodiment, the server issues a response which comprises one instructions located in a header, which defines one of the following actions:
the control of the polling;
the activation or the unactivation of the display;
a procedure for checking the mapping between the frame identifier and the room number;
a procedure for generating metrics regarding cache procedures used by the Internet Access Provider (IAP);
a procedure for displaying a note dedicated to the guest of the particular room wherein is located the digital frame;
a discovery procedure for the wireless network environment of the frame, particularly applicable in infrastructure mode.

Preferably, the response transmitted by the server complies with the MRSS standard and comprises additional headers for the purpose of defining actions to be executed by the frame.

Preferably, the digital frames are situated in hotels under control of a centralized server wherein the database comprises a table of mapping between the digital frame identifiers and the room numbers or room names, as well and information related to the check-in and check-out of the rooms, so as to provide the occupant of the room to receive really contextual multimedia content.

In one particular embodiment, the information which is transmitted to the centralized server by the digital frame is used in a likelihood analysis for the purpose of determining a possible move of the frame.

The invention also achieves a display device, such as a digital frame without any keyboard, which includes one or more sensors defined in the following list:
a motion sensor, particularly based on a infrared sensor;
a brightness sensor;
means for location;
one or more safety sensors, such as a smoke detector;
a compass type sensor.

In one particular embodiment, the digital frame comprises detectors for discovering, either in infrastructure mode and/or in adhoc mode, the visible wireless networks as well as the n neighbouring display devices, so as to report such information to the server for the purpose of its storage within the contextual database.

At last, the invention also achieves a process of interaction between a digital frame for displaying digital media under the control of a centralized server and a mobile Information Handling system (IHS), such as a smartphone, a digital tablet or a laptop computer etc. . . . , the process involving the steps of:
displaying a QR code by means of the digital frame, which QR code is adapted to be scanned and which comprises an identifier of the digital frame as well as an identifier of a resource (URL) allowing either the installation of an application, either an access to the centralized server so as to establish an interaction between the images which are displayed by the frame and the information being typed by the user on the mobile IHS system.

The invention is particularly well adapted to the new transactions and services which can be provided by digital frames.

BRIEF DESCRIPTION OF THE DRAWINGS

Other features of one or more embodiments of the invention will appear from the following description of embodiments of the invention, with reference being made to the accompanying drawings.

DESCRIPTION

There will now be described how one can distribute a set of digital frames within a public or private premises, and specifically within an hotel comprising a set of rooms, each room being arranged for receiving one or more of these digital frames.

Figure 1:
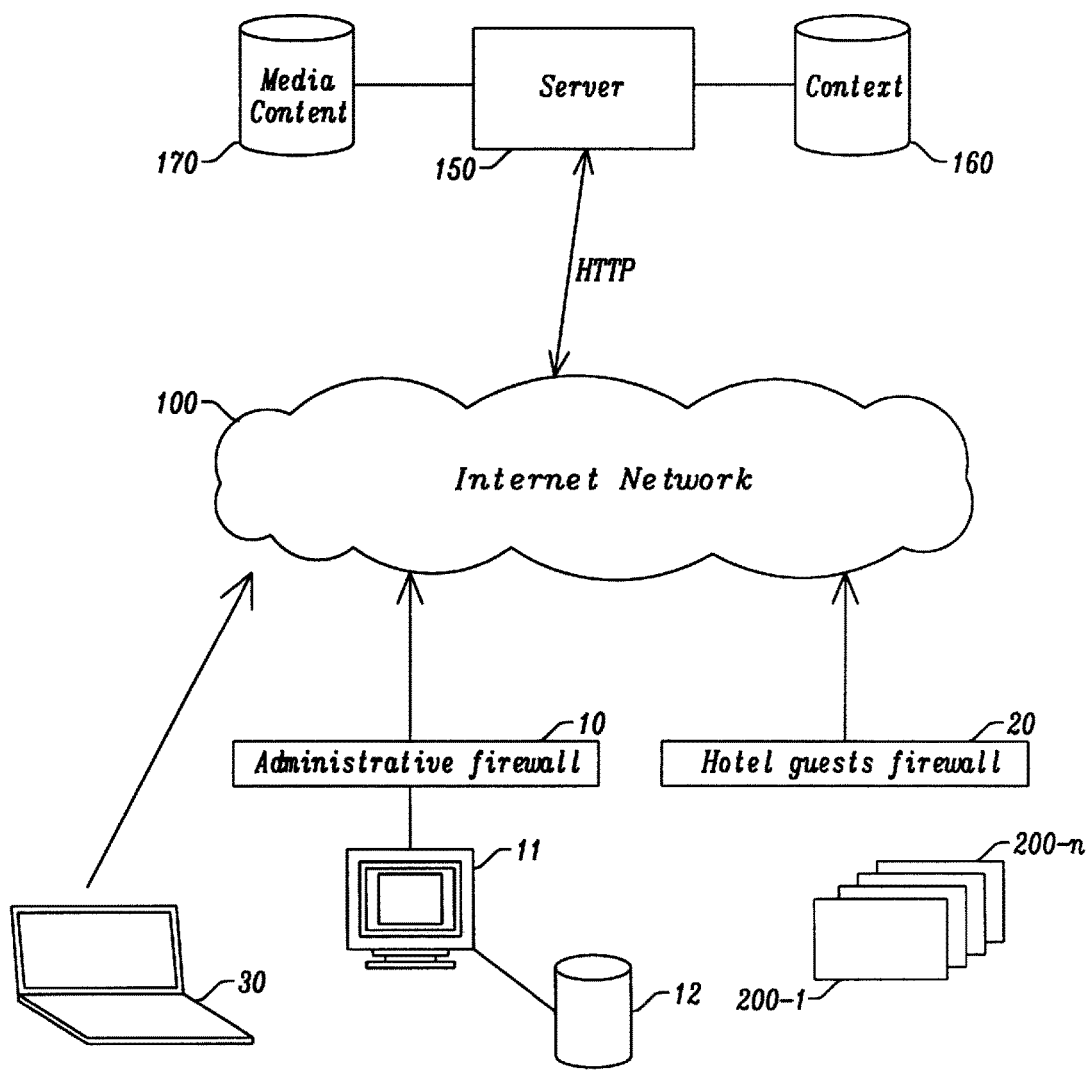
FIG. 1 illustrates a general view showing the distribution of a set of digital frames in accordance with the present invention.

FIG. 1 is a general view of a typical network configuration which can be used in an hotel providing its guests with an access to the Internet network 100.

For that purpose, a set of two distinct networks, at least, is arranged.

A first network is dedicated to the administrative management of the hotel, and is particularly well secured by means of a first firewall 10, to which are connected a set of computers and peripherals used by the hotel staff, such as computer 11 of the hotel Reception, accessing a specific management database 12—often named Property Management System (PMS). Typically, the PMS database gathers all the information relative to the room booking, the guest services, check-in and check-out etc. . . .

A second network, generally wireless, is also arranged and dedicated to provide the hotel guests with an access to the Internet Network, by means of a second fire-wall 20.

In one particular embodiment, one considers a set of N digital frames 200-1 to 200-n, particularly distributed within a set of hotel rooms, and which also have a wireless access to the internet network, either through a specific network, either through the particular network which is dedicated to the hotel guests (via firewall 20).

In particular, one may configure the access points composing the infrastructure of the wireless network so as to arrange a BSSID (Basic Service Set IDentifier) being dedicated to the displays or to the digital frames.

It should be noticed that server 150 can also be accessed through a specific portal—outside of the context of the administrative network via firewall 10 or the guests network via firewall 20—so as to allow third parties and even the hotel staff to access server 150, even from their own domicile by means of a computer 30.

At it will be seen below with the description of the different procedures, the network of digital frames 200-1 to 200-*n* is used for disseminating a media content which is personalized or "contextual" under the control of a centralized server 150, generally located in another country. This server is arranged with a central database 160 which collects a wide number of parameters and data relating, not only to the different hotels, but also to their different rooms and the services provided therefrom. Is also collected more general information relating to the local or national weather forecasts, news in some countries as well as different relevant local or national information.

The aim of the central database 160, for the operator of the centralized server 150, is to provide multiple hotels with media dissemination services which can be really customized in accordance with the hotel guests (language, profile etc. . . . ), with the particular category of the room which those guests reside, with actual data relating to the check-in or check-out of the rooms, and also with national or local news (weather forecasts, news) or useful information, so as to finally provide the different guests with a really contextual information, highly valuable for the hotel.

One will notice that, if one restaurant within the hotel is full, one staff member will be given the opportunity to transmit an information to be gathered within database 160, so as to avoid that server 150 disseminate any promotional information relating to that fully booked restaurant but, on the contrary, promotes another restaurant within the hotel.

Similarly, database 160 which is managed by server 150, can also be used for disseminating a promotional information for the hotel pool, particularly when the latter shows a reduction of visitors.

It can be seen that there is a great interest for a hotel to use such a sophisticated communication tool, and which development, because of its complexity, can not be contemplated at a local level. Conversely, it is of a great interest for the operator of server 150 to give a commercial access to this tool and the complex algorithms therein included, so as to generate a really contextual and valuable information, which can be used by a great number of hotels.

In order to allow server 150 to gather a precise and valuable information, there is provided, in one particular embodiment, a particular access to the PMS system of the hotel so as to collect information regarding to the room occupation, the dates and hours of check-in and check-out, as well as some specific additional information in use in international hotels, such as the rate code associated to the room, the market code information.

Most often, the server 150 shall not require the access to information which is personal to the guests (which is acknowledged to be a highly sensitive information) but it will be sufficient to collect general information regarding the profile, the nationality etc. . . .

In this manner, server 150 can centralize—in a manner which can generally remain anonymous—the flow the information relating to the booking and the occupation of the rooms of one particular hotel, so as to continuously update the information to be displayed on screens 200-1 to 200-*n*.

The database also collects the mapping between the identifiers of the screens/frames and the hotel rooms wherein such screens/frames are located.

Moreover, as it will be seen below, the contextual database 160 is also arrange to store information which is generated by different sensors located within each of the frame, so as to enrich the information being stored within the central database 160.

At last, server 150 is arranged with an access to a server 170 which stores multimedia content, so as to constitute the core of the dissemination of medias, and particularly digital photographs which can serve for the generation of MRSS files in accordance with the procedures hereinafter described.

Figure 2:
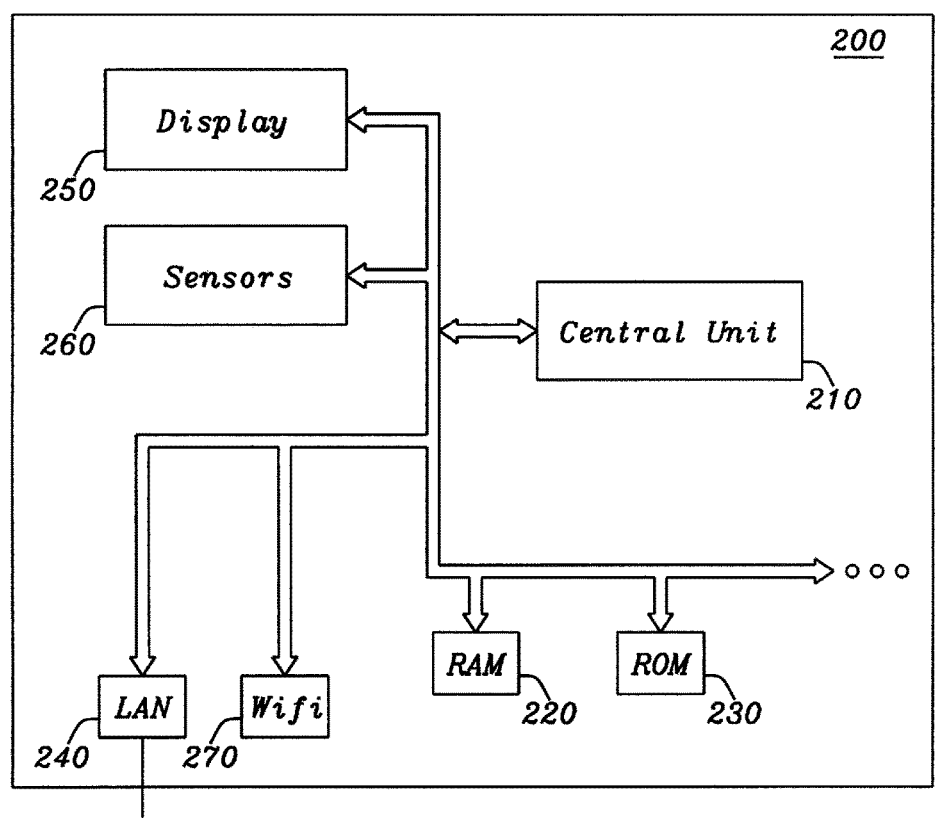
FIG. 2 illustrates the architecture of one embodiment of a digital frame.

With reference to FIG. 2, one will now describe the general architecture of one digital frame 200 which may serve to carry out each of frames 200-1 to 200-*n* illustrated in FIG. 1.

Digital frame 200 comprises a structure which is arranged around the general architecture of a conventional digital frame, that is to say which is based on a processor or a central unit 210 having an access to RAM (Read Access Memory) memory 220 or ROM (Read Only Memory) memory 230 (which can be any type of permanent or reprogram able memory, such as EEPROM—Electrically Erasable Programmable Read only Memory).

Digital frame comprises a display unit 250, a wireless communication unit 270, for instance complying with interface 802.11 (Wifi) and, optionally, a LAN (Local Access Network) card 240 which can serve for configuration purposes. Optionally, the frame may include additional components, for instance an audio unit and even a perfume generator.

Generally speaking, the architecture of such a digital frame is well known to a skilled man and it will not be required, not even useful, to provide further development on that aspect. It suffices to mention that, in one particular embodiment, the digital frame includes a set of sensors 260, with at least one sensor being selected within the following list of sensors, which is only given as possible examples:
 a motion sensor, particularly based on a infrared sensor;
 a brightness sensor;
 means for location;
 one or more safety sensors, such as a smoke detector;
 a compass type sensor.

In addition, the digital frame may include a actuation button, at the front or at the rear, so as to permit a minimal interaction between a user and the digital frame. Below, one will describe a quite elegant and sophisticated process for interacting with the digital frame. However, in some circumstances, a simple button or actuator may be quite useful, particularly when combined with a mini-camera (located at the rear of the digital frame) for the purpose of, for instance, taking a snapshot of the identification tag of the room wherein is located the considered digital frame.

The information which is provided by the different sensors can be collected and reported to the server, within a specific XML file which may then serve as a "digital signature", used for enriching the contextual database 160, as this will be shown with more details hereinafter.

There will now be described, in reference to FIG. 3, the general process for updating the multimedia contest under the control of a centralized server 150.

1. Process for Updating the Information Displayed by the Digital Frame

For the purpose of allowing each digital frame 200 to display a really contextual information taking into account not only the particular profile of the hotel, that of the room and that of the guest occupying the room, as well as different pieces of contextual information (including the local hour, the local weather forecasts, the news, . . . and even some specific information) there is provided a polling mechanism which allows periodical updating of the slideshow displayed in anyone of the digital frames 200-*n*.

Such polling mechanism is based on the periodical transmission of HTTP (Hyper Text Transfer Protocol) requests to centralized server 150 by anyone of frame 200 via firewall 20 (which is generally arranged to allow the exchange of HTTP requests) and the Internet network. In response to those requests, server 150 transmits to each digital frame a MRSS file or a XML equivalent file which is frame specific and which define the U.R.L. (Uniform Resource Locator) of the images to download and display, together with the respective duration of display.

Preferably, each digital frame 200 transmits a HTTP request which can be either a GET or a POST HTTP request, possibly and optionally associated with some headers (or Query strings) which include specific information which shall be hereinafter described, for the purpose of updating the slide-show being displayed.

Figure 3:
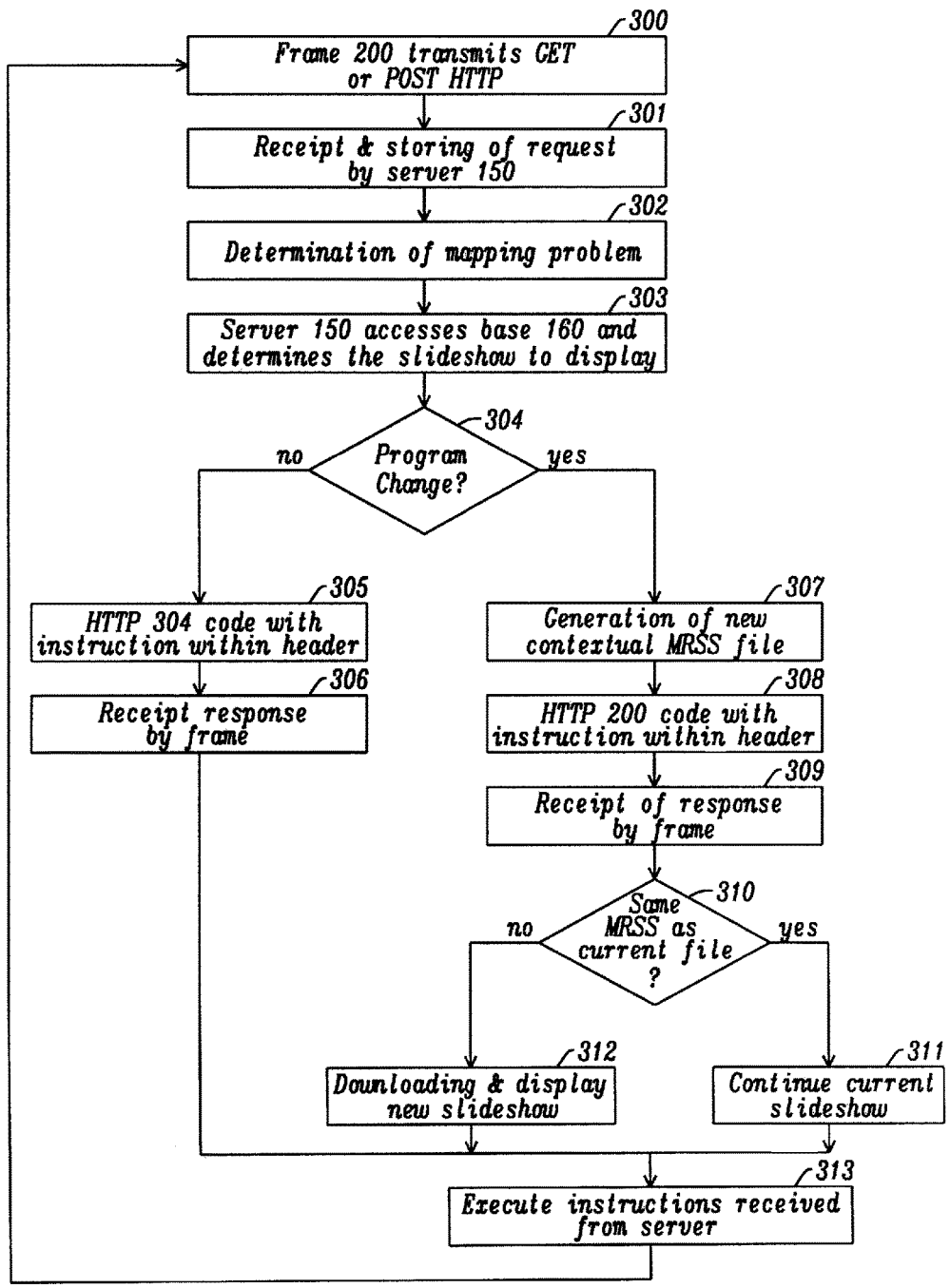
FIG. 3 illustrates one embodiment of a process for updating the information displayed by the digital frame of FIG. 2.

The process is described in reference to FIG. 3.

In one step 300, the digital frame 200-*n* transmits a HTTP request which particularly includes the identifier of the frame, such as for instance the MAC (Medium Access Layer) address of unit 270 of FIG. 2 or any other identifier known to server 150 and which can be used for accessing the database 160 for the purpose of determining, in real time, the slideshow which is currently displayed.

In one particular embodiment, the digital frame 200 uses such HTTP GET or POST request with a certain number of headers which allows the transmission of a set of additional contextual pieces of information which are specific to the digital frame and which are dedicated to enrich the contextual information which is stored within database 160, and which can be used for the purpose of the generation of the slideshow to be displayed by the digital frame.

Therefore, for instance, when the sensor detects a low brightness inside the hotel room, such information, when combined to the local hour determined by the server, can be interpreted by the latter as a strong hint that the hotel guest might wish to rest and that there might be no opportunity to display any slide-show.

On the contrary, as soon as the hotel guest is arriving into her/his room, following the check-in procedure performed at the hotel Reception, which event will be detected by the server thanks to the access to the hotel PMS system, the server 150 will be able to schedule a first slideshow—prepared in the language of the hotel guest—for the purpose of welcoming the hotel guest and introducing the services available in the hotel.

It can be seen that the constitution of a centralized database 160, collecting numerous pieces of information generated by diverse sources, particularly the digital frames, allows the development of a centralized server which can be really efficient, because it can provide services at a wide scale for thousands of digital frames, so as to display a valuable promotional information.

In one particular embodiment, the digital frame 200 also transmits, in one specific GET or POST header, a request to the server 150 for requesting the hour. Such information will be used by the digital frame for the purpose of determining the correct transmission of the requests conveyed to the server 150, and will particularly allows the detection of any attempt from the Internet Service Provider to substitute server 150 for responding to requests.

In a step 301, server 150 receives the request generated by frame 200 and logs within memory the contextual pieces of information which are possibly included.

Then, in an optional step 302, server 150 initiates an analysis of the contextual information which is reported by the frame so as to identify, when appropriate, a possible problem of mapping within the table of mapping of the database. Such procedure will be described hereinafter with more details. For the time being, it suffices to notice that such mapping problem needs to be detected by the server and, in response to such detection, the server will control the digital frame to display a generic slideshow in English language.

Then, in a step 303, the server accesses the contextual database 160 and prepares a response for the request issued by the frame. In doing so, server 150 particularly determines whether it is appropriate to switch the current slideshow to a new slideshow, as this can be seen on FIG. 3, with the test of step 304.

If no new slideshow appears appropriate, then the process proceeds with a step 305, which consists in the preparation and the transmission of a response including a HTTP code of the type "304" (which should not be confused with step 304 above), indicating that there is no need to modify the MRSS file which is being currently displayed. It should be noticed that, this is a significant advantage of the new solution which is disclosed. The "304" type response can also be associated to one or more headers defining, as it will be seen below, a set of actions to be executed by the digital frame being considered.

Then, this "304" type HTTP request is received by the digital frame 200 in a step 306, and the process proceeds without further delay with the execution of the instructions defined by server 150 in step 313.

If the test of step 304 shows, on the contrary, that it is appropriate to display a new slideshow, then the process proceeds with a step 307, wherein the list of images to be displayed is generated within a contextual MRSS file, or any equivalent XML file, by taking into account of the numerous pieces of contextual information which are stored within database 160 and which comprises the list of URL (Uniform Resource Locators) of the images to download from the media server 170 and to display on the digital frame.

In a step 308, server 150 generates a "200" type HTTP response including as an attachment a MRSS or XML file, possibly combined with one or more headers comprising, as it will be seen hereinafter, a set of actions to be executed by the digital frame being considered.

It can be seen, in one particular embodiment, that server 150 is able, by preparing a customized response for the attention to digital frame 200, to transmit to the latter a set of actions to be executed, thanks to appropriate headers which shall be described below, and which will improve the management of the digital frames.

Optionally, server 150 may also introduce timing information into the response being generated, for allowing the digital frame to evaluate the time of transmission of the request and, thus, have an objective evaluation of the quality of service of the national Internet Service Provider.

Then, in a step 309, the response is received by the digital frame 200 which then processes it.

In particular, the digital frame 200 proceeds, in a step 310, with the comparison of the received MRSS file with the currently displayed one so as to determine whether they are both distinct. Indeed, there is an interest to check that the national Internet Service Provider does not apply any abusive cache policy for the purpose of saving some bandwidth and thus substitute server 150 for generating multiple responses including a same (out of date) MRSS file while server 150 would have generated a new MRSS file to be received by the considered digital frame.

The test performed in step 310 thus allows the validation of the receipt of the file and prevent any disturbing of a given slideshow by anachronistic reinitiating the displaying of the same slideshow.

When both files are identical, then digital frame 200 continues the displaying of the current XML file in a step 311 and report the incident in an appropriate log register, so as to be able to report such information to server 150 during the next GET or POST HTTP request.

If the two files are clearly different, then the digital frame immediately proceeds, in a step 312, with the downloading of the new images being identified in the XML file and thus proceeds with the switching to the new slideshow without waiting the end of the currently displayed slideshow.

Then, in a step 313, the frame 200 proceeds with the execution of the instructions accompanying the response received from server 150.

It can be seen that, parallel with the update polling mechanism, there is arranged a real communication allowing an exchange of contextual information and commands to be executed by the frame.

In one particular embodiment, the instructions which may be received by the digital frame 200 are used for the execution of the following actions:

CHANGE SETTING: This action allows the change of the polling frequency. Therefore, this action is quite useful and allows the setting of a low frequency (for instance a HTTP request every ten minutes) during a relatively "passive" displaying and, on the contrary, can be used for arranging a relatively higher polling frequency (for instance every ten seconds) in certain circumstances, for instance when a transaction has to be finalized with the client, as this will be described with reference to FIG. 6.

DISPLAY OFF/ON: such action allows the activation or the disactivation of the display of the digital frame, so as to save power when the hotel room is not occupied.

CHECK ROOM NAME: this action is used for the purpose of a possible correction within the mapping table between the identifier of the digital frame and the room number or room name of the particular room dedicated to host that frame.

CACHE TEST: this action is used for the purpose of generating metrics relative to the cache policy of the national Internet Service Provider (ISP), particularly by checking whether one particular ISP complies with the general cache control guidelines, and also yield a precise measurement of the time required for transmitting requests and receiving the corresponding response.

EXPRESS NOTE: this action allows the transmission of one note to be displayed on the frame, in lieu of or in addition to the currently displayed slideshow or media. Such action thus provide one member of the hotel staff, from instance by accessing the portal of server 150 via the laptop 30, with an easy and efficient way to transmit a message to the room guest.

DISCOVERY: this action is used for initiating a discovery of the access points and, when appropriate, the digital frame which are in the neighboring, as this will be more clearly described with reference to FIG. 4.

The actions which were described above are non limiting examples and a skilled man will clearly consider numerous additional actions to be remotely executed by digital frame 200, in response to a corresponding instruction accompanying the HTTP response of the type "200" or "304".

As soon as the action corresponding to the instruction received is executed during step 313, the process then goes back to step 300 for the purpose of initiating a new polling or update cycle.

It can be seen that the update mechanism which is described allows the management, at a very large scale, since it can be applied to thousands of digital frames which can be distributed in hundreds of hotels located in different territories and different continents, and without requiring any local server located within the local networks of the hotels, what would without doubt make the frame management more complicated.

There is thus achieved a simple and very efficient solution for managing, at a international level and thanks to a single centralized server, the dissemination of a contextual information within hundreds of hotel premises, even when those are not supported by high level Information Technology competence in that particular field.

Thanks to such centralized management, there is achieved the possibility to disseminate a contextual and highly valuable information, based on a great number of contextual pieces of information which are available into database 160 but also on the basis of the rich documentary source stored within media server 170.

Hotel guests will then receive a rich and varied information, properly tailored according to their nationality, their culture and profile, and which will be displayed on the digital frame located within their room, without requiring any technical or marketing expertise from the hotel staff who will thus be able to perform other tasks.

Furthermore, at it will be seen below, the digital frame comprises a high number of functions used for making more efficient the displaying of a really contextual information, but also offering new services.

2. Contextual Information Reported by the Digital Frame

The contextual information which is reported by the digital frame is used, firstly, by server 150 for the purpose of being reported the internal state of the frame, or the internal value of some of its internal registers.

Therefore, during the transmission of the GET or POST HTTP requests, a digital frame 200 will be able to report to server 150 the internal state of its registers, for instance the information relative to the brightness of its display or any other information useful for the server.

More generally, the contextual information generated by the different sensors will be reported to the sever. Thus, the brightness sensor will be able to report that the curtains are drawn so as to derive the appropriate consequences for the definition of the slideshow to display (or not).

In one particular embodiment, the contextual information which is reported by the digital frame also aim at increasing the reliability of the remote control of the displaying process.

Indeed, the quality of the information which is displayed on the digital frame widely depends on the quality of the media which are stored on server 170, but a lot depends on the degree of sophistication and relevance of the algorithms used by server 150 in the precise selection of those media during the exploitation of the contextual database 160.

The operator of server 150 is certainly highly responsible of the quality of the information being displayed by the digital frame.

However, such information shall be relevant only with the assumption that the mapping between the digital frames and the room number/names within the database 160 shall be correct, and really correspond to the actual distribution in the field.

Or such mapping is not, to a large extent, under the responsibility of the operator of server 150, who is in no practical position for a daily checking that every digital frame is actually located within the hotel room that is defined in the mapping table. And this is particularly true when considering that the distance between the hotels and server 150 might reach thousands of kilometers . . . .

One could contemplate that both the operator and the hotel manager will be concerned about the correct location to assign to the different digital frames, at least during the first installation, so that each frame shall receive the right room affectation corresponding to the mapping table.

However, one can not exclude the possibility that later, some digital frames are moved from one room to another (for instance when a hotel staff needs to replace a defective frame), and this without reporting such information to the operator of the server 150.

In order to allow server 150 to rely on a precise and reliable mapping information between the digital frames and the room name/number, the digital frame 200 reports to server 150 information which are generated by its internal sensors, which will not only be used for generating the MRSS message to display, but also for the purpose of identifying a possible mapping problem within the database 160 between the frame identifier and the room name/number wherein the considered frame is assumed to be located.

To solve this problem, in one particular embodiment, the digital frame 200 comprises, as shown in the description in relation to FIG. 2, a set of sensors which are arranged to collect diverse pieces of information, which information shall be transmitted to server 150 via appropriate headers during step 300 of the process illustrated in FIG. 3.

In particular, the frame comprises one sensor which is arranged for generating a location information. In one first embodiment, a GPS (Global Positioning System) type sensor can be used, for the purpose of collecting the geographical coordinates of the digital frame 200. One may imagine that the hotel premises do not allow the receipt of a reliable GPS signal transmitted by the satellite in all the rooms hosting digital frames. However, as soon as such GPS signal will be available, if the digital frame is located close to a window or a terrace, such information will be stored into an appropriate register within the digital frame so as to be reported to server 150, for instance during step 300 of the process of FIG. 3.

Alternately, one may use any other positioning process, such as the process described in European patent EP1330074, entitled "Location device of data network appliance" filed on 21 Jan. 2002, and invented by the inventor of the present application, which process is based on the use of a device plugged on the electric power outlet allowing powering of the digital frame.

Any other combination of processes and means serving for determining the location of the digital frame can be used.

Furthermore, in the particular situation where no precise location is available to server 150, for instance because a GPS signal is too weak, server 150 proceeds with an analysis of the information collected by the frame, as a signature, so as to determine, if no precise location, at least a set of coinciding pieces of information which may serve for detecting a significant change in the information collected and thus a possible move of the digital frame into another room of the hotel.

For instance, by comparing the level of the luminosity sensed by the digital frame 200 with that of the neighboring frames, or alternatively with the level sensed the day before at the same hour, the server 150 (which also receives accurate information regarding to the weather forecasts) is given the possibility to detect a mapping problem within database 160 between the frame identifier and the room number/name Any other information, such as the power of the frame or still an information generated by an internal electronic compass might also server for enriching the contextual information report to serve 150 during step 300. Practically, all those contextual pieces of information will be collected within a single XML file, and thus will take the form of a real "signature" file which may serve the detection of any move of the digital frame.

Figure 4:
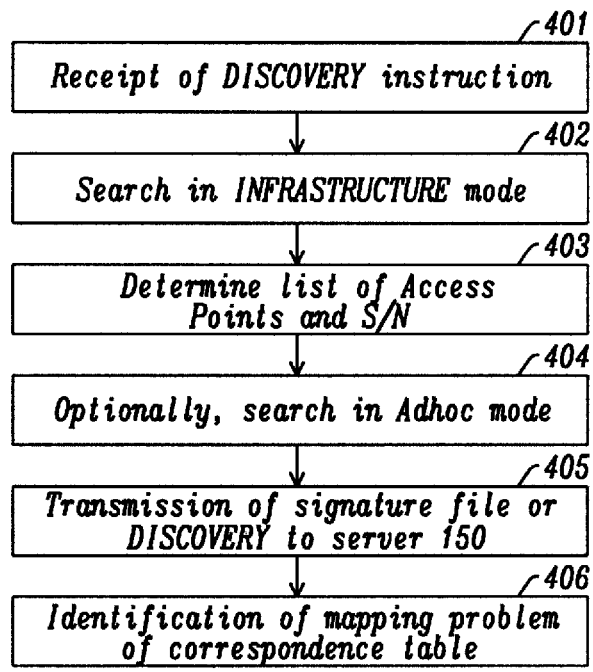
FIG. 4 illustrates one embodiment of a process of DISCOVERY allowing the digital frame of FIG. 2 to gather contextual information relating to the electromagnetic environment of the hotel room.

In order to improve the reliability of the mapping table which is stored within the database 160, the digital frame incorporates, in one particular embodiment, a specific function of DISCOVERY of the electromagnetic environment of the frame, which can be initiated in response to one specific instruction received from the server 150, and which is illustrated in FIG. 4.

In a first step 401, the digital frame 200 receives, within a "304" or "200" http response generated by the server, one DISCOVERY instruction which is comprised within one specific header during step 313 of the general polling process of FIG. 3.

Then, in a step 402, the digital frame 200 decodes such instruction and initiates a first search in infrastructure mode of the wireless networks (WIFI for instance), so as to identify the visible access points as well as the signal to noise S/N ratio corresponding to those access points.

Then, in a step 403, the digital frame 200 sets a list of visible access points and the corresponding S/N ratios, with the following information:
  BSSID (Basic Service Set IDentifier)
  SSID (Service Set IDentifier)
  the number of the frequency channel on which the access points operates;
  the quality of the signal;
  a criterium relative to the encryption mechanism Those diverse pieces of information which are gathered by the digital frame are then incorporated within a signature file for the purpose to complete the information already existing in that signature file. In this way, the whole information will be reported, either via specific headers accompanying the GET and/or POST requests or, alternatively, can be incorporated within a specific signature file, which can be subject of a transmission through a HTTP POST request.

Optionally, in a step 404, after having set up the above mentioned list, the digital frame 200 executes a discovery process in a "adhoc" mode so as to identify, not only the access points which can be used in infrastructure mode, but also the digital frames which are located in the neighboring rooms.

Two remarks should be noted:

Firstly, such discovery procedure in adhoc mode assumes the transmission by server 150 of a DISCOVERY instruction to all the frames which are assumed to be located in a same neighborhood, so as to allow mutual discovery by the latter.

Secondly, it is not necessary that the adhoc discovery procedure is executed beyond the sole gathering of the information relating to the three or four immediate neighbors, so as to allow the update of the XML file mentioned in step 403. Indeed, it is absolutely not required, in this particularly context, to determine any routing path within the digital frames for the purpose of establishing a wireless network, so that the adhoc discovery procedure will not be executed until its completion.

It suffices, for the purpose of gathering a rich information to be reported in the XML signature file (or DISCOVERY file), to discover the close neighboring frames so as to complete the information already reported in the file during the discovery search in mode infrastructure, before it is being reported to server 150.

Then, in a step 405, the digital frame transmits, during the polling process which was described above, the DISCOVERY XML file or any other piece of information which is likely to constitute part of the signature representative of the electromagnetic environment of the digital frame being considered.

Such information is then received by server 150 which can process it in a step 406, and determines, on the basis of all the information already stored within database 160, any possible mapping problem regarding the mapping table stored in database 160.

It can be seen that the digital frames provide new functions which go well beyond the displaying of slideshows within a local network.

Thanks to the numerous pieces of information which are collected by the different sensors existing in the digital frame, and which are reported to server 150, the latter can, firstly, continuously check the accuracy of the mapping table used within database 160.

Figure 5:
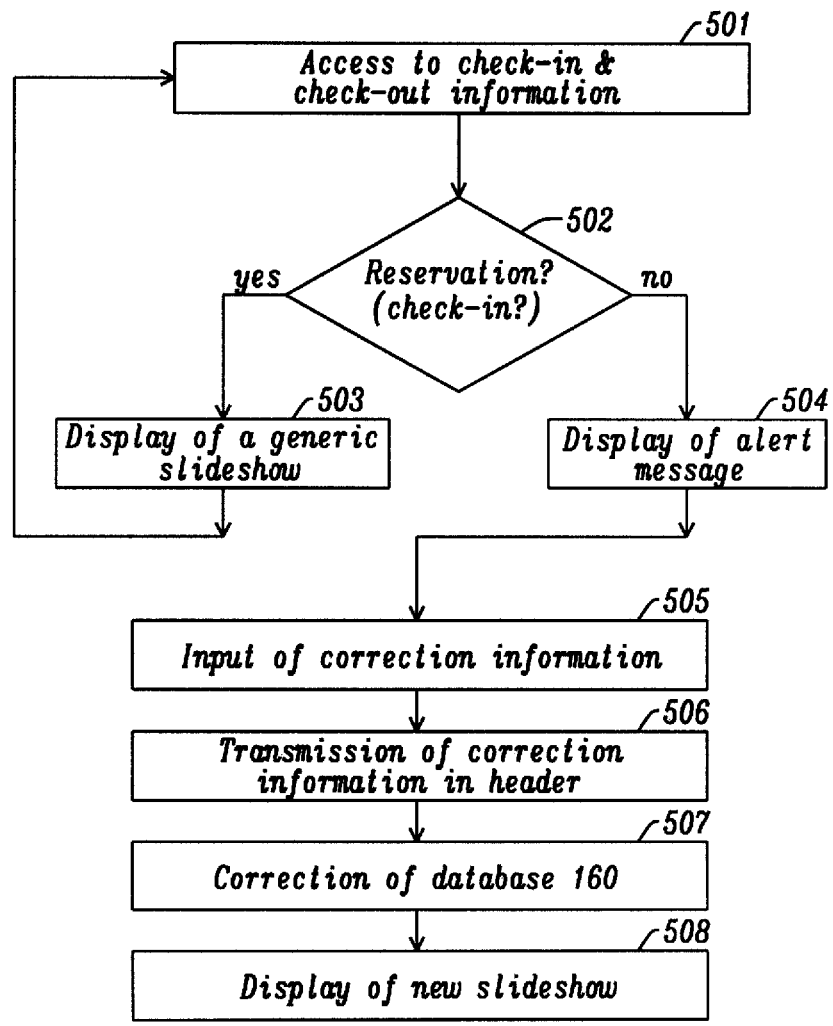
FIG. 5 illustrates one embodiment of a process for automatically correcting an error in the table of correspondence of database 160.

One will now describe, with reference to FIG. 5, one embodiment of a process for correcting an error in the mapping table of which is identified for one particular frame within the database 160.

In a step 501, the server 150 get an access to the database for the purpose of reading the "check-in" and "check-out" information for the purpose of determining the precise status of the room associated to the digital frame 200, identified as raising a mapping problem.

Then, the process proceeds with a step 502 which is a test for determining whether the status of the room is "occupied", i.e. whether one is situated within a period occurring between a "check-in" and a "check-out.

If the status of the room is "occupied", the process then proceeds with a step 503 wherein server 150 proceeds with the transmission, for instance in accordance with the process described with reference to FIG. 3, of a generic information, for instance in English language so as to prevent any possible negative reaction from the hotel guest residing into this room.

On the contrary, if server 150 identify that the corresponding room is not occupied, then server 150 schedules, during a step 504, the display of an alert message for the attention of the hotel staff, and particularly the household staff who may receive such message.

It should be noticed, and this is an advantage of this particular embodiment, that generally speaking server 150 controls, for the purpose of saving power, the turning off of the digital frame when the status of the room is not occupied, so that the household staff might be particularly sensitive to such an alert message displayed in a digital frame which is generally off.

Correction information can then be input, in one step 505, for the purpose of re-establishing the right room number (or Room Name), in accordance with different possibilities. In that respect, one may consider multiple interactions with the digital frame, and particularly the use of an actuation button mentioned above.

In one particular embodiment, the digital frame 200 includes a micro-camera which is arranged at the rear of the frame, which allows the capture and the storage of a photo in low resolution, and which can be controlled by means of the actuation button described above. In this manner, by responding to the instructions displayed on the digital frame, a household staff or any person belonging to the hotel administration is given the opportunity to perform the capture of a photograph of the label bearing the room number which is fixed on the room door.

The correction information is then transmitted by the digital frame 200, during a step 506, and received by server 150, which can then process and store it.

Server 150 then corrects, during a step 507, the correspondence between the frame identifier and the room number/name within the mapping table, so as to switch, in a step 508, to the contextual media or slideshow display mode.

The process which was described allows the transmission of an information—in this case a image file—to server 150 so as to correct any discrepancy existing between the frame identifier and the room number/names in the mapping table, which discrepancy might jeopardize the accuracy and the relevance of the digital information displayed by a frame.

Clearly, a skilled man could consider any other interaction process.

In one particular embodiment, the digital frame, although lacking in any keyboard, further includes an interaction functionality with a mobile telephone, such as a smartphone, for the purpose of allowing the confirmation of the room number/name assigned to the digital frame.

3. Interaction with the Digital Frame and New Services Provided

In one particular embodiment, the digital frame comprises one specific function allowing quite useful interaction with a mobile phone, such as a smartphone, a tactile tablet etc. . . .

To achieve this, as soon as the guest is arriving into her/his room, what can be detected by server 150 thanks to the access to the check-in information, the digital frame can display a QR code which is arranged to include a URL for the installation of one application and/or, preferably, an URL pointing to the address of the server 150.

In this manner, the hotel guest arriving in her/his room, may receive on her/his mobile phone etc. . . . a new interaction function, as this will now be described with reference to FIG. 6.

In a step 601, the process starts with the transmission, by server 150, of control information for controlling the display on remote frame 200 of a QR code.

This QR code can be scanned by the hotel guest, by means of any application being available (being generally present in a smartphone), such as MOBILE TAG or any other. This QR code thus allows the opening of the browser of the smartphone, at the address defined by the URL included within the QR code.

Then, in a step 602, the server receives a http request issued by the mobile phone, such request including the digital frame identifier characterizing the frame having displayed the QR code, and then stores that information.

As soon as this request is received, the server can establish a correspondence, that is to say a relation between the mobile phone issuing the request and the digital frame 200 which is identified within such request.

This results in the fact that the server is then able to control the display of the information which are simultaneously displayed on the digital frame 200 and on the screen of the mobile telephone belonging to the hotel guest.

To achieve this, in a step 603, the server 150 proceeds with the transmission, via the own "data" access of the mobile phone, of a web page, properly tailored and formatted, comprising diverse pieces of information and/or tools allowing a useful interaction between the guest smartphone and the contextual information displayed on the digital frame 200.

In a step 604, server 150 controls the contextual information transmitted to the digital frame 200, via the polling process described above, so as to support the interaction with the web page displayed on the mobile screen.

In particular, in one step 604, the server 150 may thus control a dual display on the mobile screen and on the digital frame 200, so as to really support an offer for transaction which is simultaneously displayed on the two devices. Indeed, server 150 can detect any correspondence between the data input by the guest/client on his mobile phone, and the information which is being displayed on the digital frame via its own wireless network, thus completing a real transaction being executed throughout the two networks and the two sessions initiated with the server.

The client may thus, by simply using a URL displayed on the "desk" of his mobile smartphone, achieve a real interaction which is displayed with total transparency despite the fact that both devices have their own network and access to the Internet, and particularly despite the presence of firewall 20 which, in principle, prevents any direct request being forwarded to digital frame 200.

Such interaction leads, generally with a step 606, to the validation of the transaction being considered.

It can be seen that the process allows a real interaction which is completely transparent for the guest/client, who can even not imagine the reality of those two parallel communication sessions which are initiated and managed under the control of the centralized server, and which achieve, in a very advantageously manner, the initiation and the completion of all types of transactions.

In particular, one may imagine that one professional photographer took a set of high resolution photographs during the stay of the client and her/his family, and has stored all those snapshots on a protected area within server 170.

Server 150 will thus be able to propose a transaction to the client, thanks to the parallel control of the displaying of the digital frame and the displaying of the screen of the smartphone of the same client.

Such transaction, may cover, for instance, the selection of one or more snapshots being displayed on the digital frame, for the purpose of arranging a commercial sale. Such selection can be efficiently performed, via the keyboard and the screen of the mobile phone allowing the input of data which are then transmitted to server 150 via the DATA access of the mobile phone.

As soon as the client completes such selection, the corresponding information is received by server, who can then control the transmission of a confirmation receipt to be displayed on the digital frame and/or the screen of the mobile phone, thus confirming the validation of the transaction.

Once the transaction is validated, the server can then transmit a link to the smartphone for allowing the client to download the high resolution snapshot which was object of the transaction.

It can be seen that the new process which has been described, by creating a link thanks to the QR code displayed on one particular digital frame and a mobile smartphone, to open the way to a real interaction with the owner of the mobile phone and the digital frame controlled by server 150.

With the opening of a wide range of new applications and services offered to the hotel guests. In particular, as soon as the transaction is validated, the purchase of the photographs can be directly invoiced to the client when the latter leaves the hotel, during the check-out procedure.

Figure 6:
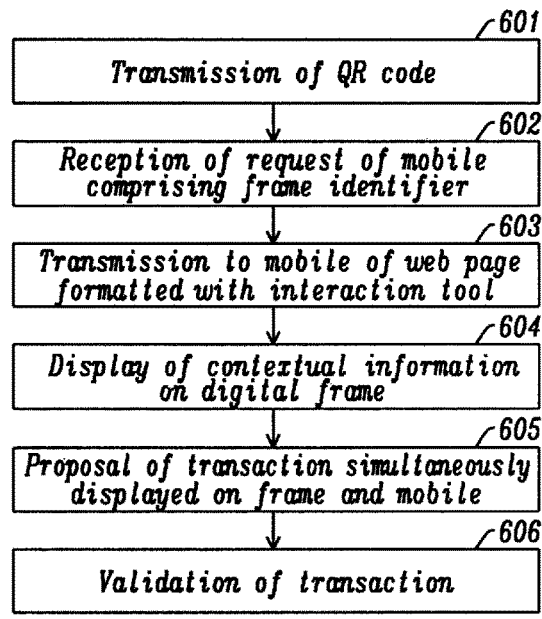
FIG. 6 illustrates one embodiment of a process allowing an interaction between the digital frame and the mobile device, such as a smartphone.

The process which was described in relation with FIG. 6 shows how it is possible to create a quite useful interaction between the guest mobile phone and the digital frame thanks to the QR code displayed on the digital frame.

In one particular embodiment, the QR code allows the installation of an application which can be directly downloaded from server 150 into the mobile phone, and which is dedicated to the transmission of location information, similar to the information described above for the digital frame, for the purpose of submitting an offer to the mobile owner for new services.

Figure 7:
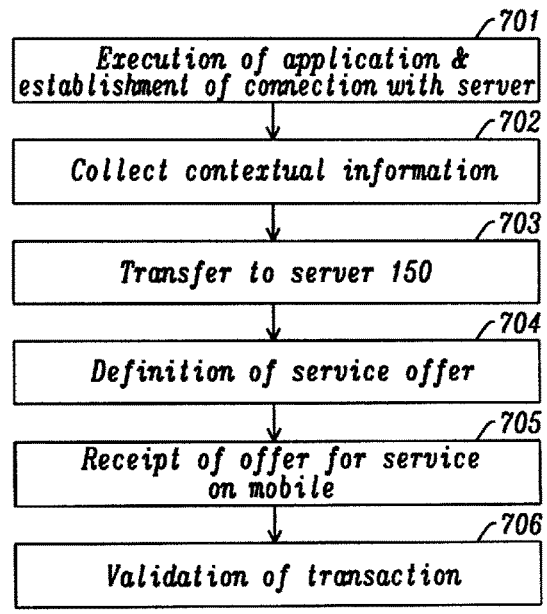
FIG. 7 illustrates an embodiment which allows the installation of an application which is downloaded from the server to the mobile phone of a guest, for the purpose of submitting an offer to the guest for new services.

Such a process is described in relation to FIG. 7.

In a step 701, the process launches the application and establishes a connection with the centralized server 150 via the own DATA access of the mobile phone.

Then, in a step 702, the process proceeds with the gathering of contextual information, particularly relevant to the location of the mobile phone.

To achieve this, one may gather the information which is available through the existing GPS sensor. Alternatively, in a "Internet" context, wherein such information is not available, the process proceeds with the gathering of infrastructure information used by the digital frames which were described above, and particularly the access points, their specific parameters (SSID) and the metrics of the signal.

Such contextual information is gathered and then transmitted, in a step 703, to server 150.

Then, in a step 704, the server 150 proceeds with the processing of the information being gathered and transmitted, so as to allow the use of the contextual database 160 for the purpose of defining a well tailored offer, which particularly takes into account of the information reported by the mobile phone.

Such offer for a new service is then transmitted by the latter, and then received, in a step 705, by the mobile phone.

In a step 706, the transaction is being completed, when appropriate, so as to validate the service offered to the client.

Then, in an optional step, a confirmation message is transmitted to the mobile phone and, possibly, to the digital frame corresponding to the latter.

It can be seen that the arrangement of the general network composed of the digital frames, under control of a centralized server, can be the support of a new set of services which can be offered to the hotel guests, thanks to the use of the digital frames described above, in combination with the mobile smartphones of the hotel guests.

Such example demonstrates the great interest one may see in the development of such a network of digital frames.

One will further notice that, although the different embodiments which were described above all refer to a screen of a type "digital frame", which clearly corresponds the best mode of operation of the invention, the skilled man will be able to apply the teaching of the invention to many different devices, and particularly a tactile tablet, as known by the general public and which, on the contrary of the digital frame, include a tactile screen which offer the possibility of displaying a keyboard usable by the client.

Still more generally, one may also apply the teaching of the invention to the use of any computer, such as a laptop and even a desktop—comprising a central unit, a keyboard and a display device. There is also arranged a stand-by mode and control means for the display device for executing the procedures described above for the digital frame, for the purpose of allowing, in the stand-by mode, the displaying of the slideshows or media under the control of server 150 accessing the contextual database. As for the digital frame, the process is based on the periodical transmission by the computer, during the stand-by—of request comprising an identifier and accompanied by headers defining the contextual information which are to be reported to server 150 and then stored within the database. The server responds to the request by means of a response defining the media or slideshow to display, accompanied by headers defining one or more actions to be executed by the computer during the stand-by mode.

It can be seen that all the procedures which were described above with reference to the digital frame can thus be applied to the computer when the latter is in the stand-by mode, such as a digital frame.

Multiple applications of the invention can be provided.

What is claimed is:

1. A process for controlling the displaying of media on a display device, such as a digital frame, under the control of a centralized server accessing a contextual database, the process being based on a periodical transmission by said display device of a request comprising an identifier of said display device and also comprising headers defining contextual information reported to said server and stored within said contextual database, said server responding to said request by means of a response defining the media to display, accompanied by headers defining one or more actions to be executed by said display device;
   wherein said display device and said server communicate through an Internet network via a Internet Service Provider (ISP) to apply a cache policy to the responses transmitted by said centralized server to said display device;
   wherein said request are Hyper Text Transfer Protocol (HTTP) GET or POST requests comprising the identifier of the display and an IP address, accompanied by headers defining contextual information to be reported to said centralized server for the purpose of being stored within said database, wherein said responses received from said server comprise an Extensible Mark-up Language (XML) file including a list of Uniform Resource Locators (URL) defining the images to download and display, together with the duration of display, said response also comprising headers defining one or more actions to be executed by said display device; and
   wherein the display device performs the following steps:
      compare a newly received XML file with an XML file being currently displayed for the purpose of determining a possible application of a cache policy by said Internet Service Provider when the received XML file and the current XML file are identical; and
      validate said newly received XML file when said newly received XML file is distinct from said current XML file, and immediately proceed with the downloading of images defined in said newly received XML file; and
      when said newly received XML file is identical to said current XML file, continue the displaying of the images defined in the current XML file and report the result of said comparison to said centralized server through a next GET or POST HTTP request.

2. The process according to claim 1 wherein said display device is a digital frame and wherein said requests are Hyper Text Transfer Protocol (HTTP) GET or POST requests comprising the identifier of the frame and an IP address accompanied by headers defining contextual information to be reported to said server for the purpose of being stored within said database, wherein said responses received from said server comprise an Extensible Mark-up Language (XML) file including a list of Uniform Resource Locators (URL) defining the images to download and display, together with the duration of display, said response also comprising headers defining one or more actions to be executed by said digital frame.

3. The process according to claim 2, wherein said digital frame transmits a Hyper Text Transfer Protocol (HTTP) GET or POST request accompanied by headers defining one or more pieces of information generated by one or more sensors among the following:
   a brightness sensor;
   means for location;
   one or more safety sensors, such as a smoke detector; and
   a compass type sensor.

4. The process according to claim 1, wherein said server transmits an instruction included in one header accompanying said response, said instruction controlling one of the following actions:
   the control of a polling;
   the activation or the inactivation of the display;
   a procedure for checking a correspondence between a frame identifier and a room number;
   a procedure for generating metrics regarding cache procedures used by an Internet Access Provider (IAP);
   a procedure for displaying a note dedicated to the guest of a room in which the digital frame is located; and
   a discovery procedure for the wireless network environment of the frame, particularly applicable in infrastructure mode.

5. The process according to claim 1 wherein said server transmits a response complying with Media Real Simple Syndication (MRSS) standard identifying the URL of the photographs to display in combination with an action to be executed by the digital frame.

6. The process according to claim 1 wherein the display devices are digital frames set up in hotels under the control of said centralized server wherein the contextual database comprises a mapping table between the identifiers of said digital frames and room numbers/names as well as information relative to check-in and check-out of the rooms.

7. The process according to claim 6 wherein said frame transmits information to said server for the purpose of performing a likelihood analysis for detecting any move of said frame.

8. The process according to claim 1 wherein said display device is the display of a tactile tablet or that of a computer being used during a stand-by mode.

9. A display device, such as a digital frame lacking a keyboard, which performs a process for controlling the displaying of media on the display device, under the control of a centralized server accessing a contextual database, the process being based on periodic transmission by said frame of a request comprising an identifier of said display device and also comprising headers defining contextual information reported to said server and stored within said contextual database, said server responding to said request by means of a response defining the media to display, accompanied by headers defining one or more actions to be executed by said display device,
   wherein said display device and said server communicate through an Internet network via a Internet Service Provider (ISP) applying a cache policy to the responses transmitted by said centralized server to said display device;

and further comprising at least one sensor, comprising at least one of:
 a brightness sensor;
 location identification device; or
 one or more safety sensors, such as a smoke detector;
 an internal electronic compass, wherein said display device is configured for transmitting a HyperText Transfer Protocol (HTTP) POST command allowing simultaneous transmission by said display device of contextual information to the server together with the request of a media to display;
wherein said request are Hyper Text Transfer Protocol (HTTP) GET or POST requests comprising the identifier of the display and an IP address, accompanied by headers defining contextual information to be reported to said centralized server for the purpose of being stored within said database, and which responses received from said server comprise an Extensible Mark-up Language (XML) file including a list of URL's defining the images to download and display, together with the duration of display, said response also comprising headers defining one or more actions to be executed by said display device; and
wherein the display device is configured to compare a newly received XML file with a XML file being currently displayed for the purpose of determining a possible application of a cache policy by said Internet Service Provider when the received XML file and the current XML file are identical; and
wherein the display device validates said newly received XML file when said newly received XML file is distinct from said current XML file, and immediately proceeds with the downloading of the images defined in said newly received XML file; and conversely, when said newly received XML file is identical to said current XML file, the display device is configured to continue the displaying of the images defined in the current XML file and report the result of said comparison to said centralized server through a next GET or POST HTTP request.

10. The display device, such as a digital frame lacking in any keyboard, which performs the process according to claim 9 wherein said display device is a digital frame and wherein said requests are Hyper Text Transfer Protocol (HTTP) GET or POST requests comprising the identifier of the frame and the IP address accompanied by headers defining contextual information to be reported to said server for the purpose of being stored within said database, and which responses received from said server comprise an Extensible Mark-up Language (XML) file including a list of URL defining the images to download and display, together with the duration of display, said response also comprising headers defining one or more actions to be executed by said display device.

11. The display device, such as a digital frame lacking a keyboard, which performs the process according to claim 10, wherein said digital frame transmits a Hyper Text Transfer Protocol (HTTP) GET or POST request accompanied by headers defining one or more pieces of information generated by one or more sensors, wherein said one or more sensors comprise:
 a brightness sensor;
 location identification device;
 one or more safety sensors, such as a smoke detector; or
 an internal electronic compass.

12. The display device, such as a digital frame lacking a keyboard, which performs the process according to claim 9, wherein said server transmits an instruction included in one header accompanied said response, said instruction controlling one of the following actions:
 control of a polling;
 activation or inactivation of the display;
 a procedure for checking the correspondence between a frame identifier and a room number;
 a procedure for generating metrics regarding cache procedures used by an Internet Access Provider (IAP);
 a procedure for displaying a note dedicated to a guest of the particular room in which is located the digital frame; and
 a discovery procedure for the wireless network environment of the frame, particularly applicable in infrastructure mode.

13. The display device, such as a digital frame lacking a keyboard, which performs the process according to claim 9 wherein said server transmits a response complying with a Media Real Simple Syndication (MRSS) standard identifying the URL of the photographs to display in combination with an action to be executed by the digital frame.

14. The display device, such as a digital frame lacking a keyboard, which performs the process according to claim 9 wherein the display devices are digital frames set up in hotels under the control of said centralized server wherein the database comprises a mapping table between the identifiers of said digital frames and the room number/name as well as information relative to the check-in and check-out of the rooms.

15. The display device, such as a digital frame lacking a keyboard, which performs the process according to claim 14 wherein said frame transmits information to said server for the purpose of performing a likelihood analysis for detecting any move of said frame.

16. The display device, such as a digital frame lacking a keyboard, which performs the process according to claim 9 wherein said display device is the display of a tactile tablet or that of a computer being used during a stand-by mode.

17. The display device according to claim 9, which detects in infrastructure or in adhoc mode, visible wireless networks as well as the different display devices located in the neighborhood, so as to report such information to said server and store it within said contextual database.

18. The display device according to claim 9 comprising a camera for capturing one image which is to be transmitted via a Hyper Text Transfer Protocol (HTTP) POST request to said server and stored within said database.

\* \* \* \* \*